POLYMERS FOR USE IN IMAGE RECEIVING ELEMENTS FOR METALLIZABLE DYES IN IMAGE TRANSFER FILM UNITS

The present invention relates to novel polymers, metallized polymers and the use of the metallized polymers in photographic elements, particularly photographic image transfer film units.

The use of various dyes and dye forming materials in photographic processes and particularly in image transfer processes has been known for quite some time. In many cases, however, dye image stability has been a problem in that the dyes may tend to wander from the image receiving layer after processing, be destroyed in dark reactions or fade due to light exposure over a period of time.

The use of metal complexes of some ortho substituted azo dyes in image transfer processes reduces fade as these metallized dyes have been found to be extremely light resistant.

Premetallized dyes are described in U.S. Pat. Nos. 3,482,972, 3,453,107, 3,563,739, 3,597,200 and 3,705,184 wherein premetallized dye developers are coated in the image-forming element of an image transfer film unit and release metallized dyes as a function of exposure. On development, these premetallized dyes then diffuse to an image receiving layer. In some instances, a metallic salt can be in a receiving layer and the dye or dye forming material can be metallizable rather than premetallized. That is, the dye or dye forming material contains groups which will chelate with the metal ions to form the metallized dyes in the receiver, such as described in U.S. Pat. Nos. 3,081,167, 3,196,014 and British Pat. Nos. 905,701 and 1,121,995.

It has been found that the metallizable dye approach has the advantages of faster diffusion in some cases and the ability to use the metallization as a dye hue shifting mechanism. The use of the metallizable dye or dye former, however, requires the use of a metallizing image receiving layer. In many instances, wandering of the metal ions from the receiving layer can result in deleterious sensitometric effects in the light-sensitive emulsion layer and an increase in access time in image transfer processes due to premature metallization. Further, since the metal ion source would be located in the image receiving layer, unwanted color and stain under basic or acidic conditions may occur.

In commonly assigned copending U.S. application Ser. No. 944,477, filed Sept. 21, 1978 by Archie and Campbell entitled "Photographic Elements Containing Polymers Which Coordinate With Metal Ions," a chelating polymer having the recurring unit:

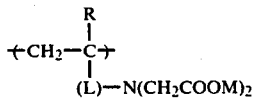

wherein:
R is H, halogen or alkyl;
L is a linking group; and
M is H, an ammonium cation or alkali metal is described as a preferred material to coordinate with metal ions and be used in image transfer film units in a receiving element for metallizable dyes. The use of these polymers prevents the diffusion of metal ions throughout the film unit and still allows for rapid metallization of the dye or dye forming material. In many instances, however, these polymers are not water-soluble or water dispersible and cannot be coated in the same layer with the mordant and metal ions, as the polymer forms insoluble chelates with metal ions. Therefore, to be employed in a photographic unit, the polymeric chelates are preferably formed in a two-layer process whereby the chelating polymers are coated over a gelatin layer containing metal ions.

It has been found that copolymers formed from N-vinylbenzyliminodiacetic acid and either acrylamide or anionic sulfonate monomers form stable, water-soluble or water dispersible chelates with metal ions. Therefore, these resulting chelates can be applied by coating only one layer, rather than the two layers required previously.

The polymer, in accordance with our invention, comprises units having the formula:

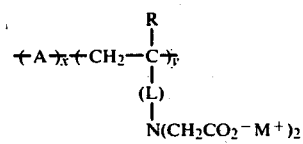

wherein:
A is a unit selected from the group consisting of

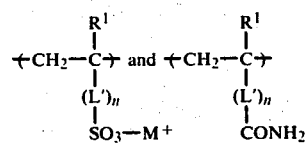

R and $R^1$ are independently H; halogen such as chloro, bromo and the like; and alkyl, preferably containing from about 1 to 6 carbon atoms such as methyl, propyl, isobutyl, hexyl and including substituted alkyl such as chloropropyl, cyanobutyl and the like;

L and L' are independently bivalent linking groups. Examples of useful bivalent linking groups are alkylene containing from 1 to about 6 carbon atoms such as methylene, ethylene, 2-methyl-1,2-propylene and the like; arylene containing 6 to about 10 carbon atoms such as phenylene, naphthalene, and the like; arylenealkylene containing about 7 to 11 carbon atoms such as phenylenemethylene; $COOR^3$ such as carboxyethylene; and $CONHR^3$ such as carbonyliminoethylene and 2-carbonylimino-2-methyl-1,2-propylene wherein $R^3$ is arylene, alkylene, or arylenealkylene as described above;

n is 0 or 1;

M is selected from the group consisting of H; an ammonium cation such as ammonium, tetraethylammonium, tetrabutylammonium, trimethylbenzylammonium and the like; and an alkali metal, such as potassium, sodium, lithium, and the like;

x is from 20 to 95 percent by weight and preferably from 20 to 60 percent by weight; and y is from 80 to 5 percent by weight and preferably from 20 to 40 percent by weight.

In a particularly preferred embodiment, the polymer also comprises units ⫹B⫹ wherein B is a recurring unit

POLYMERS FOR USE IN IMAGE RECEIVING ELEMENTS FOR METALLIZABLE DYES IN IMAGE TRANSFER FILM UNITS

The present invention relates to novel polymers, metallized polymers and the use of the metallized polymers in photographic elements, particularly photographic image transfer film units.

The use of various dyes and dye forming materials in photographic processes and particularly in image transfer processes has been known for quite some time. In many cases, however, dye image stability has been a problem in that the dyes may tend to wander from the image receiving layer after processing, be destroyed in dark reactions or fade due to light exposure over a period of time.

The use of metal complexes of some ortho substituted azo dyes in image transfer processes reduces fade as these metallized dyes have been found to be extremely light resistant.

Premetallized dyes are described in U.S. Pat. Nos. 3,482,972, 3,453,107, 3,563,739, 3,597,200 and 3,705,184 wherein premetallized dye developers are coated in the image-forming element of an image transfer film unit and release metallized dyes as a function of exposure. On development, these premetallized dyes then diffuse to an image receiving layer. In some instances, a metallic salt can be in a receiving layer and the dye or dye forming material can be metallizable rather than premetallized. That is, the dye or dye forming material contains groups which will chelate with the metal ions to form the metallized dyes in the receiver, such as described in U.S. Pat. Nos. 3,081,167, 3,196,014 and British Pat. Nos. 905,701 and 1,121,995.

It has been found that the metallizable dye approach has the advantages of faster diffusion in some cases and the ability to use the metallization as a dye hue shifting mechanism. The use of the metallizable dye or dye former, however, requires the use of a metallizing image receiving layer. In many instances, wandering of the metal ions from the receiving layer can result in deleterious sensitometric effects in the light-sensitive emulsion layer and an increase in access time in image transfer processes due to premature metallization. Further, since the metal ion source would be located in the image receiving layer, unwanted color and stain under basic or acidic conditions may occur.

In commonly assigned copending U.S. application Ser. No. 944,477, filed Sept. 21, 1978 by Archie and Campbell entitled "Photographic Elements Containing Polymers Which Coordinate With Metal Ions," a chelating polymer having the recurring unit:

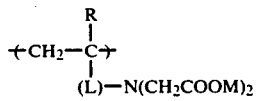

wherein:
R is H, halogen or alkyl;
L is a linking group; and
M is H,
an ammonium cation or alkali metal is described as a preferred material to coordinate with metal ions and be used in image transfer film units in a receiving element for metallizable dyes. The use of these polymers prevents the diffusion of metal ions throughout the film unit and still allows for rapid metallization of the dye or dye forming material. In many instances, however, these polymers are not water-soluble or water dispersible and cannot be coated in the same layer with the mordant and metal ions, as the polymer forms insoluble chelates with metal ions. Therefore, to be employed in a photographic unit, the polymeric chelates are preferably formed in a two-layer process whereby the chelating polymers are coated over a gelatin layer containing metal ions.

It has been found that copolymers formed from N-vinylbenzyliminodiacetic acid and either acrylamide or anionic sulfonate monomers form stable, water-soluble or water dispersible chelates with metal ions. Therefore, these resulting chelates can be applied by coating only one layer, rather than the two layers required previously.

The polymer, in accordance with our invention, comprises units having the formula:

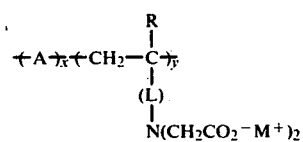

wherein:
A is a unit selected from the group consisting of

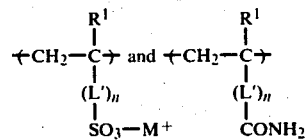

R and $R^1$ are independently H; halogen such as chloro, bromo and the like; and alkyl, preferably containing from about 1 to 6 carbon atoms such as methyl, propyl, isobutyl, hexyl and including substituted alkyl such as chloropropyl, cyanobutyl and the like;

L and L' are independently bivalent linking groups. Examples of useful bivalent linking groups are alkylene containing from 1 to about 6 carbon atoms such as methylene, ethylene, 2-methyl-1,2-propylene and the like; arylene containing 6 to about 10 carbon atoms such as phenylene, naphthalene, and the like; arylenealkylene containing about 7 to 11 carbon atoms such as phenylenemethylene; $COOR^3$ such as carboxyethylene; and $CONHR^3$ such as carbonyliminoethylene and 2-carbonylimino-2-methyl-1,2-propylene wherein $R^3$ is arylene, alkylene, or arylenealkylene as described above;

n is 0 or 1;

M is selected from the group consisting of H; an ammonium cation such as ammonium, tetraethylammonium, tetrabutylammonium, trimethylbenzylammonium and the like; and an alkali metal, such as potassium, sodium, lithium, and the like;

x is from 20 to 95 percent by weight and preferably from 20 to 60 percent by weight; and y is from 80 to 5 percent by weight and preferably from 20 to 40 percent by weight.

In a particularly preferred embodiment, the polymer also comprises units ⁺B⁺ wherein B is a recurring unit

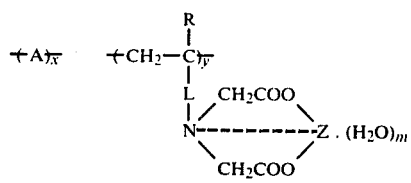

wherein (A) is selected from the group consisting of:

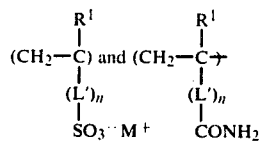

The support for the photographic element can be any support material typically useful for photographic elements such as those described on page 5 of the November, 1976 edition of *Research Disclosure*, the disclosure of which is hereby incorporated by reference.

The chelating acid dye or dye forming material is one which contains chelating groups (any group which will donate a pair of electrons to a metal ion), a salt thereof or a hydrolyzable dye precursor thereof such as an alkali metal salt or a quaternary ammonium salt of a chelating group or a hydrolyzable acyl group. Examples of these chelating groups include hydroxy, amino, carboxy, sulfonamido, sulfamyl, a hydrolyzable ester having the formula —OCOR$^I$, OCOOR$^I$, -OCON(R$^1$)$_2$ or -COOR$^I$, wherein R$^I$ is an alkyl group having 1 to about 4 carbon atoms, such as methyl, ethyl, isopropyl, butyl and the like, or an aryl group having 6 to about 8 carbon atoms such as phenyl, etc.

Generally, any acid dye or dye forming material containing the above chelating groups will be useful herein as the metallizable dye or dye forming material. Examples of such dyes are those dye developers described in U.S. Pat. Nos. 3,081,167 and 3,196,014 and British Pat. Nos. 905,701 and 1,121,995.

Useful dye forming materials include redox dye releasers containing dye moieties containing the chelating groups. These dye forming materials are disclosed in U.S. Pat. No. 4,142,891 issued March 6, 1979 by B. D. Baigrie et al. The nondiffusible compounds having a releasable azo dye moiety generally can have the formula:

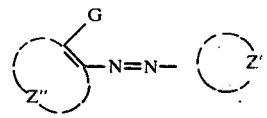

wherein:

Z" represents the atoms necessary to complete an aromatic carbocyclic or heterocyclic nucleus having at least one ring of 5 to 7 atoms, such as phenyl, pyridyl, naphthyl, pyrazolyl, indolyl, etc.;

Z' is an aromatic carbocyclic or heterocyclic nucleus having at least one ring having 5 to 7 atoms (e.g., the same nuclei as described above for Z), and Z' having in a position adjacent to the point of attachment to the azo linkage either (a) a nitrogen atom in the ring of the nucleus which acts as a chelating site, or (b) a carbon atom in the ring of the nucleus having attached thereto a nitrogen atom which acts as a chelating site;

G is a metal chelating group (any group which will donate a pair of electrons to a metal ion) or a salt thereof (e.g. an alkali metal salt, a quaternary ammonium salt, etc.) or a hydrolyzable precursor thereof (e.g., a hydrolyzable acyl or ester group), e.g., hydroxy; amino; carboxy; sulfonamido; sulfamoyl; a hydrolyzable ester group having the formula —OCOR$^1$, —OCOOR$^1$, —OCON(R$^1$)$_2$ or —COOR$^1$, wherein R$^1$ is an alkyl group having 1 to about 4 carbon atoms, such as methyl, ethyl, isopropyl, butyl and the like, or an aryl group having 6 to about 8 carbon atoms, such as phenyl, etc.; or a group which together with

is a ballasted carrier moiety (as defined below) which is attached to the Z-nucleus through the oxygen of the

group; the compound containing a ballasted carrier moiety capable of releasing the diffusible azo dye, under alkaline conditions, such as, for example, as a function (either direct or inverse) of development of the silver halide emulsion layer.

In the above formula, G can be either a monovalent group or a nitrogen atom as part of a heterocyclic ring fused to Z". In this later instance, the Z" and G atoms can form a nucleu which is the same as the Z' nucleus.

There is great latitude in selecting a carrier moiety which is attached to the azo dye-releasing compounds described above. Depending upon the nature of the ballasted carrier selected, various groups may be needed to attach or link the carrier moiety to the azo dye. Such linking groups are considered to be a part of the ballasted carrier moiety. It should also be noted that when the dye moiety is released from the compound, cleavage may take place in such a position that part or all of a linking group if one is present, and even part of ballasted moiety may be transferred to the image-receiving layer along with the dye moiety. In any event, the azo dye nucleus as shown above can be thought of as the "minimum" which is transferred.

Ballasted carrier moieties useful herein are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; *Research Disclosure* 14447, April 1976; and U.S. Pat. No. 4,139,379 issued Feb. 13, 1979 of Chasman et al (dye released by miscellaneous mechanisms).

In a further preferred embodiment, the ballasted carrier moiety or CAR as described above may be represented by the following formula:

(Ballast-Carrier-Link) — wherein:
(a) Ballast is an organic ballasting radical of such molecular size and configuration as to render the compound nondiffusible in a photographic element during development in an alkaline processing composition;
(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

$$(a)(C=C)_b$$

wherein:
b is a positive integer of 1 to 2; and
a represents the radicals OH, SH, NHR$^1$— wherein R$^1$ is as earlier described, or hydrolyzable precursors thereof; and
(c) Link represents a group which upon oxidation of said Carrier moiety is capable of being hydrolytically cleaved to release the diffusible azo dye. For example, Link may be the following groups:

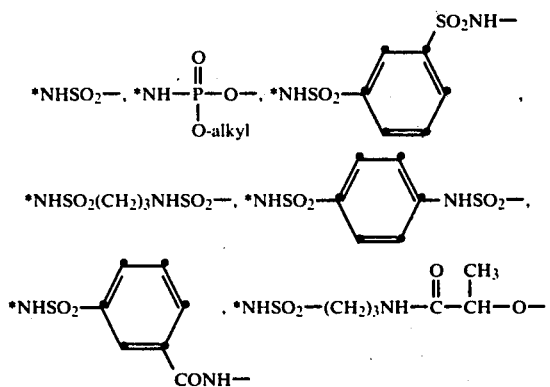

wherein * represents the position of attachment to Carrier.

The Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the carbocyclic or heterocyclic nucleus, etc. Useful Ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc, a keto radical having 8 to 30 carbon atoms such as —CO—C$_{17}$H$_{35}$, —CO—C$_6$H$_4$-(t—C$_{12}$H$_{25}$), etc.

For specific examples of Ballast-Carrier-Link moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formulas is a group having the formula:

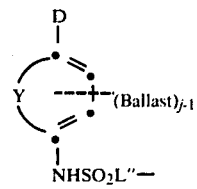

wherein:
(a) Ballast is an organic ballasting radical of such molecular size and configuration (e.g., simple organic groups or polymeric groups) as to render the compound nondiffusible in a photographic element during development in an alkaline processing composition;
(b) D is OR$^2$ or NHR$^4$ wherein R$^2$ is hydrogen or a hydrolyzable moiety and R$^4$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when R$^4$ is an alkyl group of greater than 8 carbon atoms, it can serve as a partial or sole Ballast);
(c) Y represents the atoms necessary to complete a benzene nucleus, a naphthalene nucleus, or a 5 to 7 membered heterocyclic ring such as pyrazolone, pyrimidine, etc;
(d) j is a positive integer of 1 to 2 and is 2 when D is OR$^2$ or when R$^4$ is hydrogen or an alkyl group of less than 8 carbon atoms; and
(e) L" is a linking group which is [X—(NR$^5$—J)$_q$]$_m$— or X—J—NR$^4$— wherein:
  (i) X represents a bivalent linking group of the formula —R$^6$—L'''$_n$—R$^6$$_p$— where each R$^6$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;
  (ii) L''' represents a bivalent radical selected from oxy, carbonyl, carboxamido, carbamoyl, sulfonamido, ureylene, sulfamoyl, sulfinyl or sulfonyl;
  (iii) n is an integer of 0 or 1;
  (iv) p is 1 when n equals 1 and p is 1 or 0 when n equals 0, provided that when p is 1 the carbon content of the sum of both R$^6$ radicals does not exceed 14 carbon atoms;
  (v) R$^5$ represents a hydrogen atom, or an alkyl radical having 1 to about 6 carbon atoms;
  (vi) J represents a bivalent radical selected from sulfonyl or carbonyl;
  (vii) q represents an integer of 0 or 1; and
  (viii) m represents an integer of 0, 1 or 2.

Especially good results are obtained when D is OH, j is 2, Y is a naphthalene nucleus, and G is OH.

Examples of the ballasted carrier moiety in this highly preferred embodiment are disclosed in U.S. Pat.

Nos. 4,076,529 and 3,928,312; French Pat. No. 2,284,140; and German Pat. Nos. 2,406,664; 2,613,005; and 2,505,248, the disclosures of which are hereby incorporated by reference, and include the following:

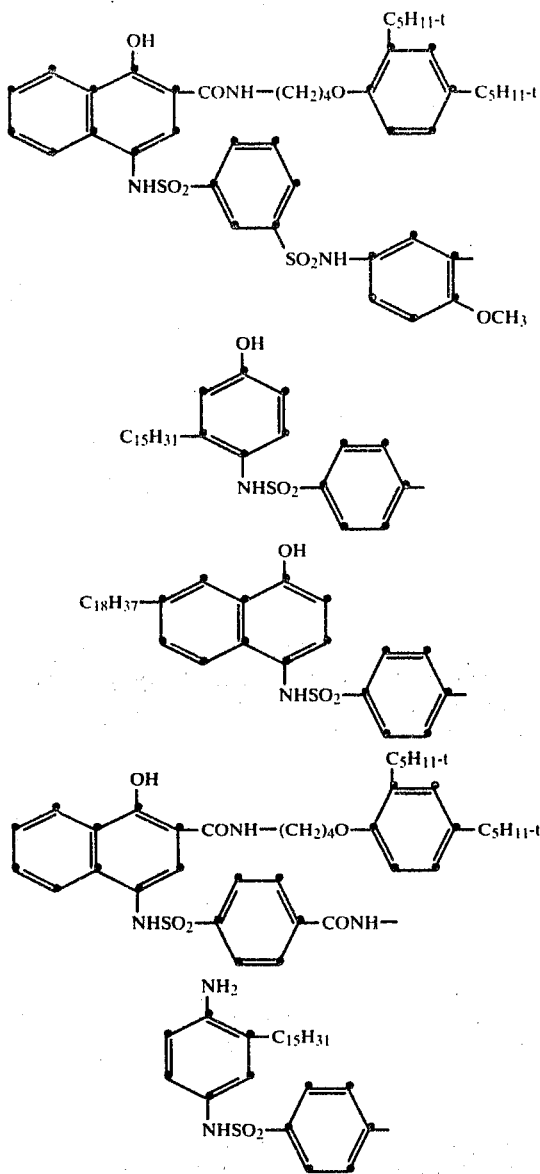

In another embodiment the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

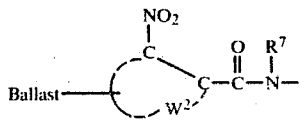

(I)

wherein:
Ballast is an organic ballasting radical of such molecular size and configuration as to render the compound nondiffusible in a photographic element during development in an alkaline processing composition;
$W^2$ represents at least the atoms necessary to complete a benzene nucleus (including various substituents thereon); and
$R^7$ is an alkyl (including substituted alkyl) radical having 1 to about 4 carbon atoms.

Examples of the ballasted carrier moiety in this formula I include the following:

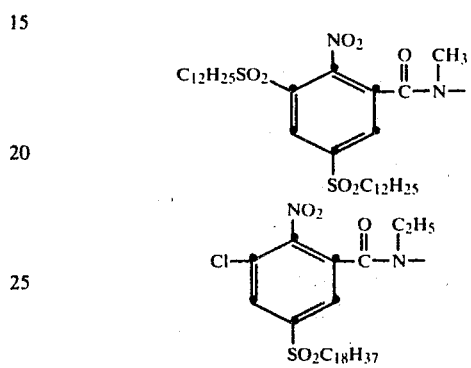

In a second embodiment of positive-working dye-release chemistry as referred to above, the ballasted carrier moiety or CAR in the above formulas may be a group having the formula:

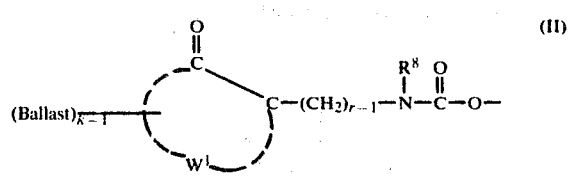

(II)

wherein:
Ballast is an organic ballasting radical of such molecular size and configuration as to render the compound nondiffusible in a photographic element during development in an alkaline processing composition;
$W^1$ represents at least the atoms necessary to complete a quinone nucleus (including various substituents thereon);
r is a positive integer of 1 or 2;
$R^8$ is an alkyl (including substituted alkyl) radical having 1 to about 40 carbon atoms or an aryl (including substituted aryl) radical having 6 to about 40 carbon atoms; and
k is a positive integer of 1 to 2 and is 2 when $R^8$ is a radical of less than 8 carbon atoms.

Examples of the CAR moiety in this formula II include the following:

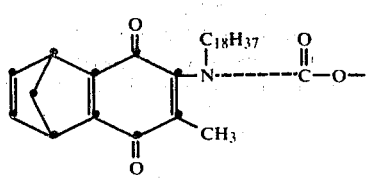

-continued

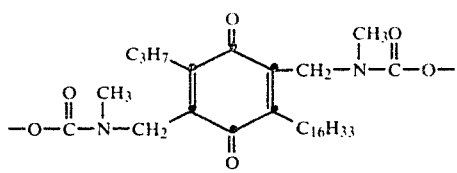

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 issued Feb. 13, 1979, the disclosure of which is hereby incorporated by reference.

In a third embodiment of positive-working dye-release chemistry as referred to above, the ballasted carrier moiety or CAR in the above formulas may be a group having the formula:

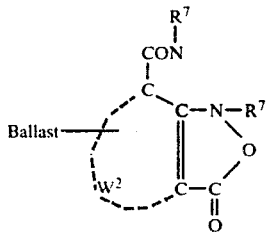

(III)

wherein:

Ballast, $W^2$ and $R^7$ are as defined for formula I above.

Examples of the CAR moiety in this formula III include the following:

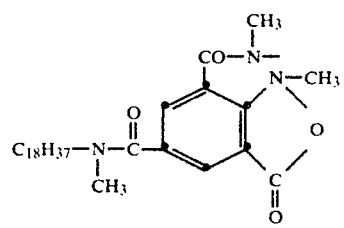

-continued

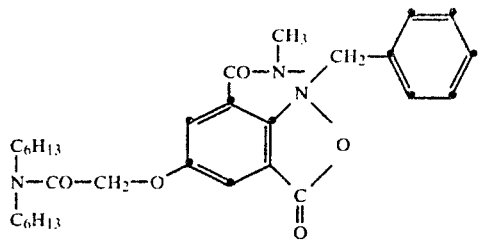

For further details concerning this particular CAR moiety, including synthesis details, reference is made to U.S. application Ser. No. 534,966 of Hinshaw et al, filed Dec. 20, 1974, the disclosure of which is hereby incorporated by reference.

In a fourth embodiment of positive-working dye-release chemistry as referred to above, the ballasted carrier moiety or CAR in the above formulas may be a group having the formula:

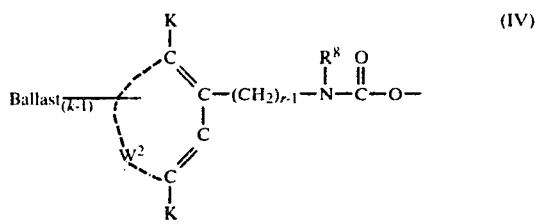

(IV)

wherein:

Ballast, r, $R^8$ and k are as defined for formula II above;

$W^2$ is as defined for formula I above; and

K is OH or a hydrolyzable precursor thereof.

Examples of the CAR moiety in this formula IV include the following:

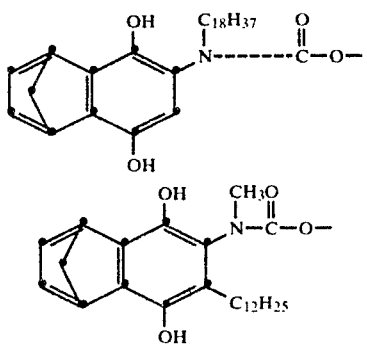

For further details concerning this particular CAR moiety, including synthesis details, reference is made to U.S. Pat. No. 3,980,479 of Fields et al, issued Sept. 14, 1976, the disclosure of which is hereby incorporated by reference.

Representative metallizable dye or dye forming compounds useful in the invention include the following:

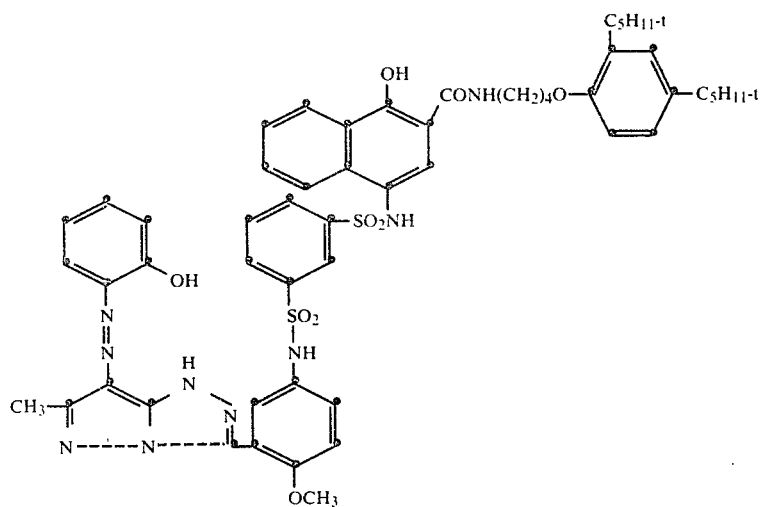
(1)
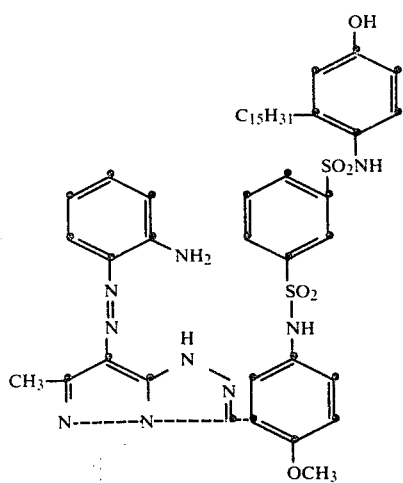
(2)
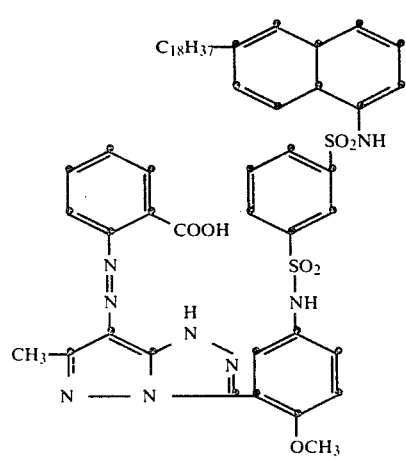
(3)

-continued
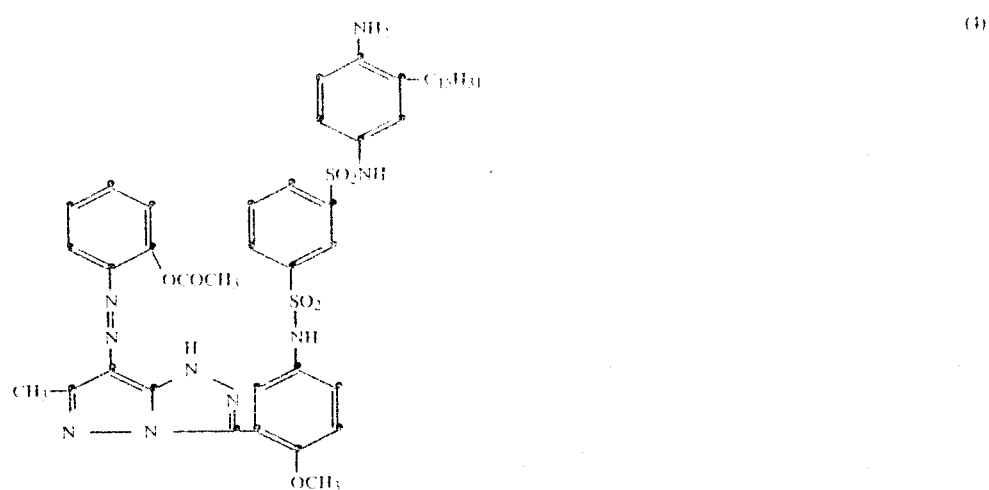
(4)
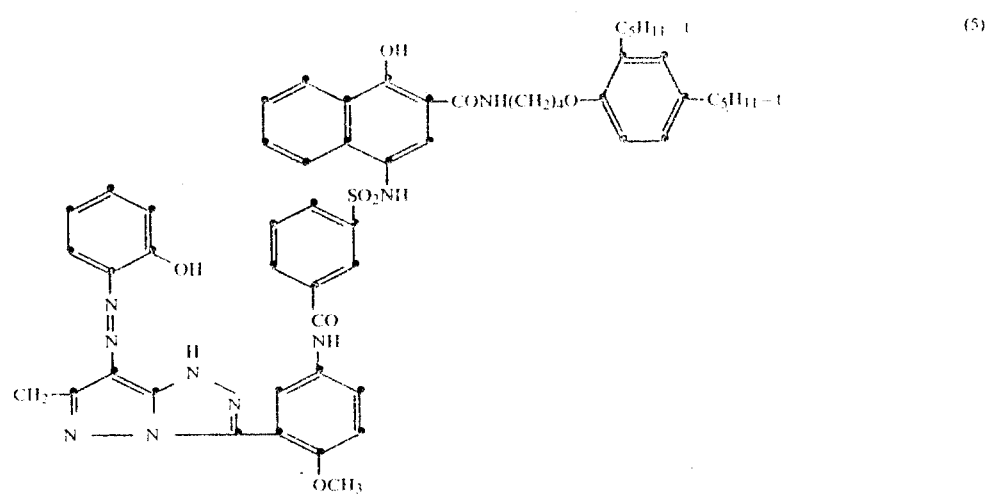
(5)
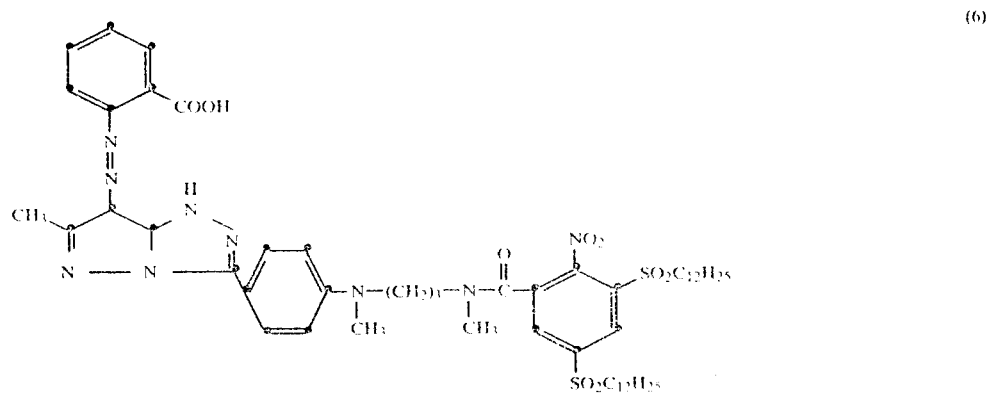
(6)

-continued
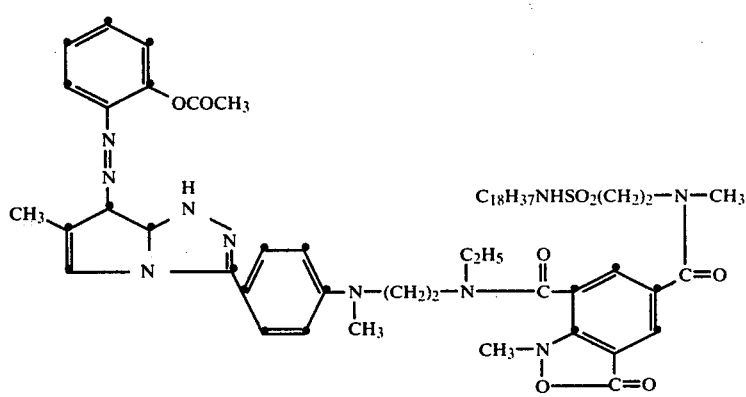
(7)
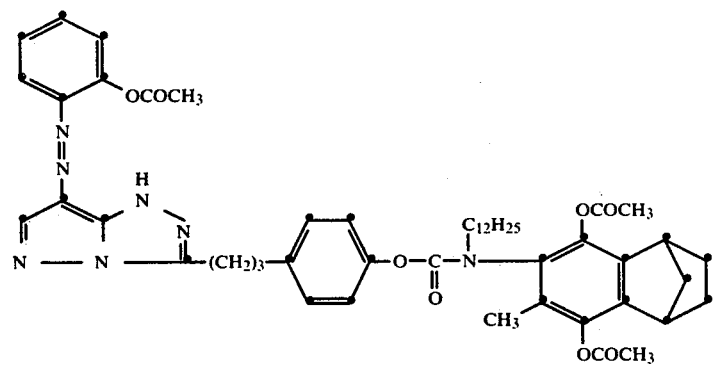
(8)
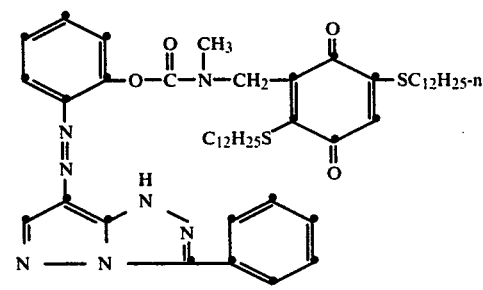
(9)
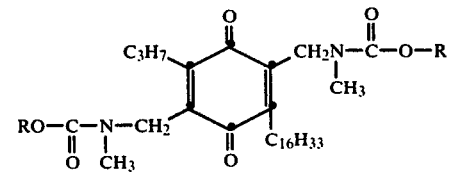
(10)
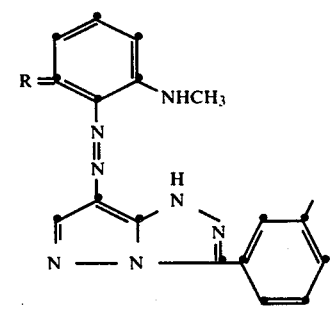

-continued
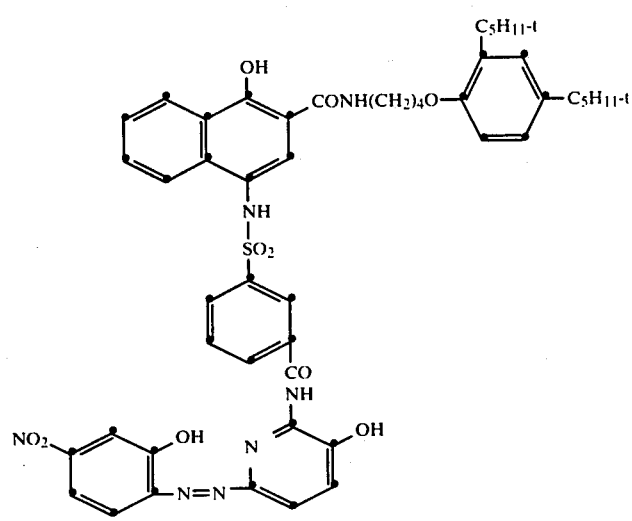 (11)
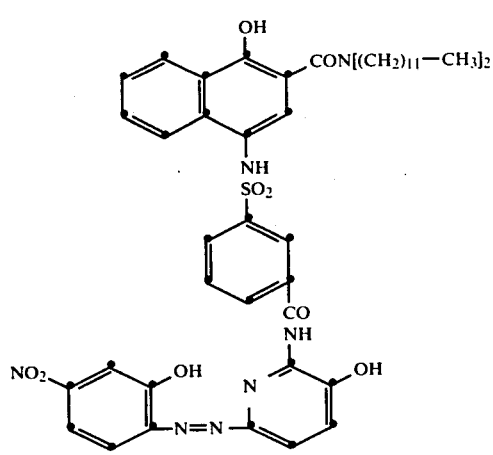 (12)
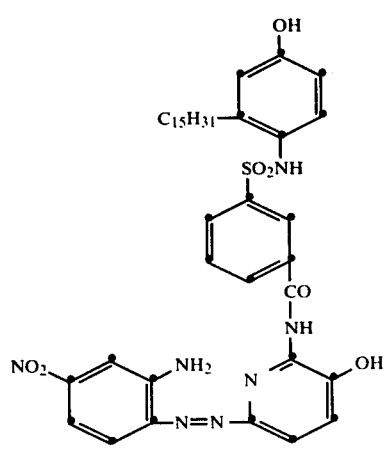 (13)

-continued
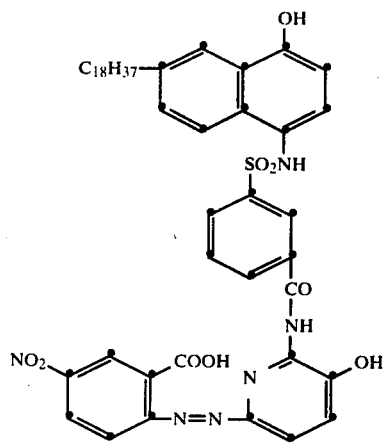
(14)
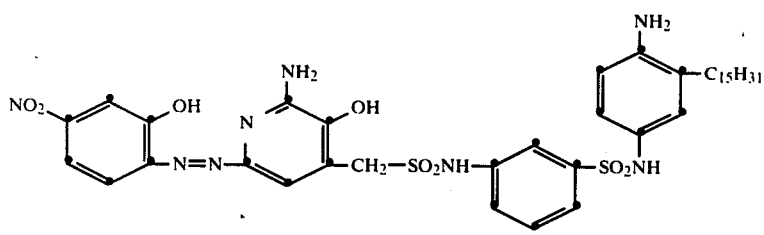
(15)
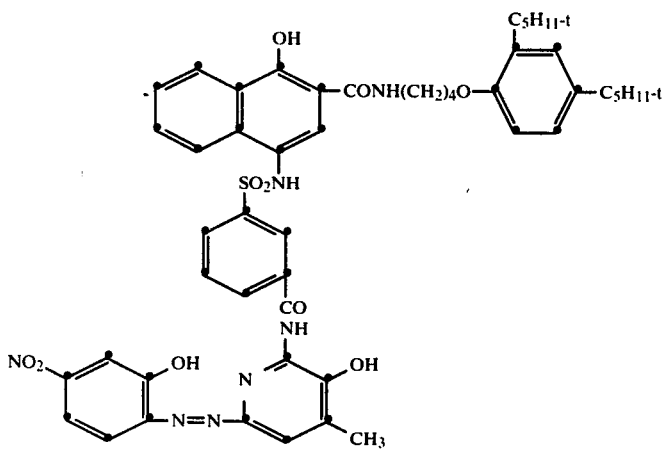
(16)
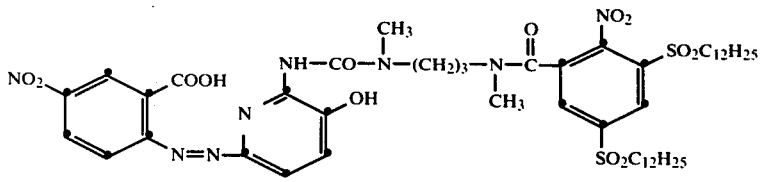
(17)
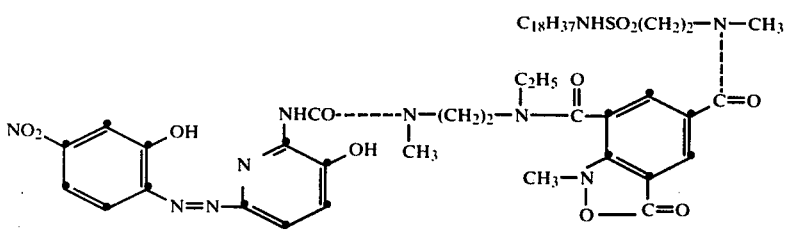
(18)

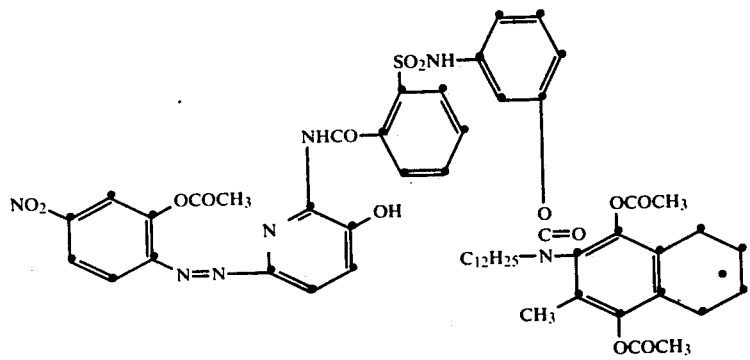
(19)
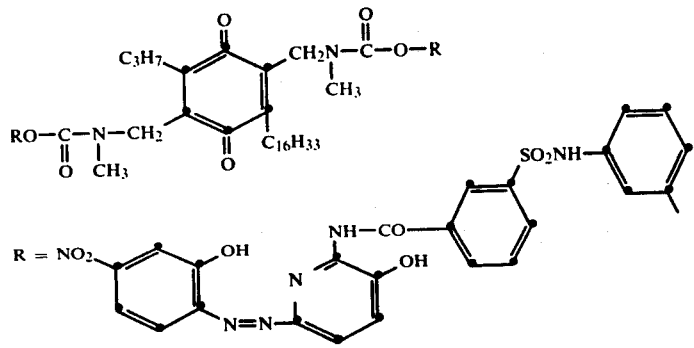
(20)
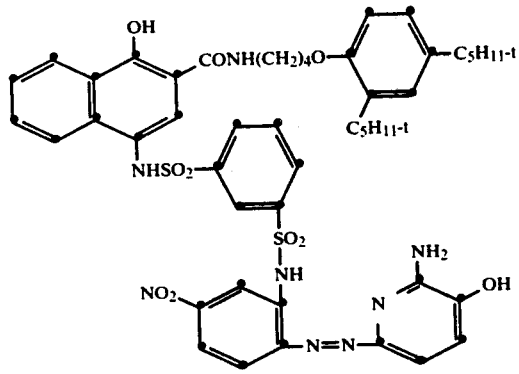
(21)
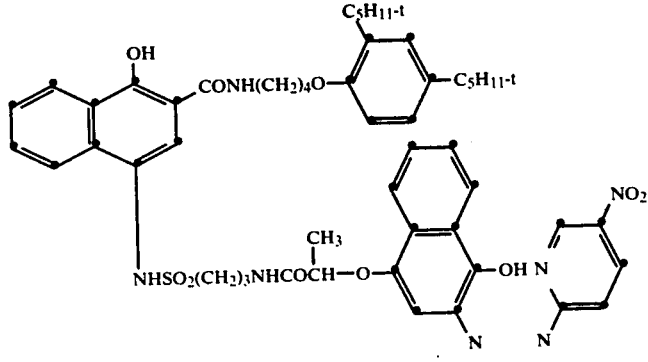
(22)

-continued

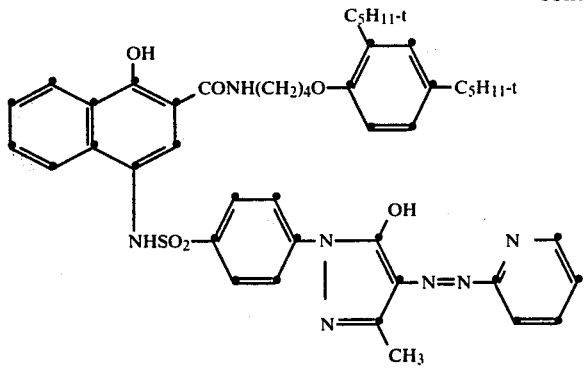
(23)

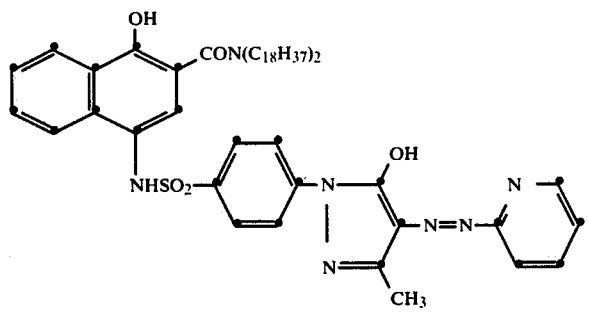
(24)

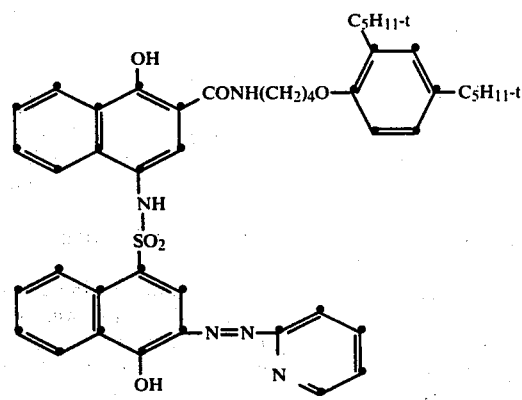
(25)

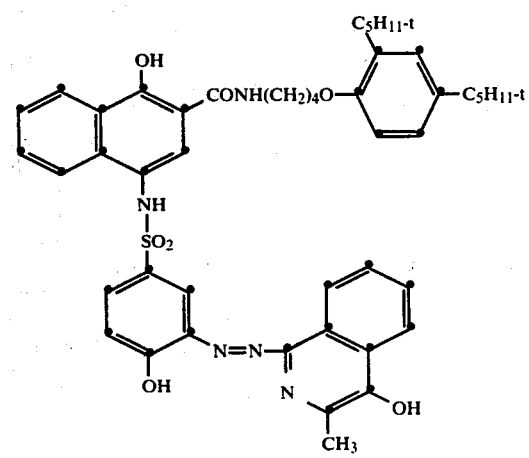
(26)

Metal ions useful in this invention are those which react speedily with the released dye or dye forming material to form a complex of the desired hue and form a dye complex which is stable to heat, light and chemical reagents. Good results can be obtained with polyvalent metal ions such as copper(II), zinc(II), nickel(II), platinum(II), palladium(II) and cobalt(II) ions. Most preferred are the transition metal ions and especially preferred are nickel(II) and copper(II).

The metal ions which are coordinated to the polymer can be derived from any source of metal ions such as a solution of a salt of the metal ions in water or a solvent such as methanol, ethanol, N,N-dimethylformamide and the like. Preferred sources of metal ions are water soluble salts such as water soluble nickel chloride, sulfate, nitrate or acetate and water soluble copper chloride, sulfate, nitrate and acetate and the like.

The metal ions and polymer can form a coordination complex by adding both into a vessel. The coordination reaction will proceed at any temperature and pressure and without the aid of a catalyst. The polymer-metal coordination complex, if soluble, can then be coated as a single layer on a photographic element in any conventional coating manner such as coating in a solvent or water with a mordant to form an image receiving layer or the source of metal ions can be coated in an adjacent (either next adjacent or in a further layer with easy access) layer to the polymer containing layer. The diffusing metal ions will coordinate to the polymer and will be prevented from wandering past the polymer containing layer. If the coordinated polymer-metal complex is insoluble, layers thereof are preferably prepared by first coating a solution of a soluble salt of the metal, then overcoating with a solution or dispersion of the polymer. While wet, the metal migrates to the polymer to form the insoluble complex in situ.

The metal to mordant ratio is generally from ~1:2 to ~1:50 and preferably ~1:5 to 1:20.

It is noted that the metal ions need only be associated with the mordant layer and the polymer containing the coordinating groups. By "associated with" it is meant that the metal ions can be coated either in the same layer with the mordant and polymer containing coordinating groups or coated in an adjacent layer which can be either next adjacent or in a layer separated by one or more layers so long as the metal ions are coordinated with the polymer prior to the diffusion of the dye ligand or dye ligand forming material to the mordant. However, the metal ions are either in the same layer as, or on the side of, the image receiving layer opposite to the side nearest the imaging layers (i.e., those layers containing the dye ligands or dye ligand forming materials). If the metal ions are located between the image receiving layer and the imaging layer, they can diffuse to the imaging layers causing severe image discrepancies. If the polymer containing coordinating groups is in a layer other than the layer containing the mordant, the diffusing dye ligand must then form a more stable coordination complex or chelate with the metal than does the polymer in order for the dye to be metallized by the polymer-metal ion complex.

In a preferred embodiment, the photographic element containing the dye receiving element is designed for use in an image transfer process.

An image transfer film unit can thus comprise:
(1) a support containing thereon at least one layer containing a photosensitive silver halide emulsion having associated therewith a chelating dye or dye forming material;
(2) a dye-image receiving layer; and
(3) an alkaline processing composition and means for discharging same within said film unit in contact with said photosensitive layer;
said film unit containing a silver halide developing agent, the improvement wherein the dye-image receiving layer comprises a polymer having the formula:

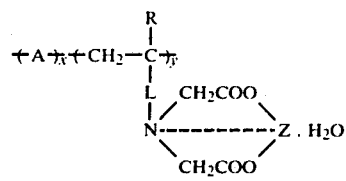

wherein (A) is selected from the group consisting of:

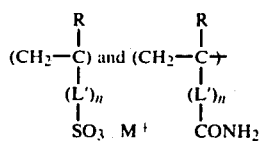

The photographic element in the above-described process can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:
(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;
the film unit containing a silver halide developing agent.

It will be appreciated that, after processing the photographic element described above, there remains in it after transfer has taken place an imagewise distribution of chelating dye or dye forming material in addition to developed silver. A color image comprising residual non-diffusible compound may be obtained in this element if the residual silver and silver halide are removed by any conventional manner well known to those skilled in the photographic art, such as a bleach bath followed by a fix bath, a bleach-fix bath, etc. Such a retained dye image should normally be treated with metal ions to metallize the dyes to increase their light fastness and shift their spectral absorption to the intended region.

In the processes described herein, the dye image-receiving layer may itself contain metal ions or the metal ions may be present in an adjacent layer on the side of the dye image-receiving layer farthest from the layer containing dye or dye forming materials, so that the dye or dye forming material which is released will form a coordination complex therewith. The dye thus becomes immobilized in the dye image-receiving layer and metallized at the same time. The formation of the coordination complex may shift the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

It is noted that a hue shift can also be obtained by blocking chelating groups of the dyes. For instance, if OH is the chelating group, the group can be blocked with acetate or other blocking groups to form a hydrolyzable precursor. On development, the dye is hydrolyzed and the hue shifts.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photo-sensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magneta or magneta-forming dye-releaser associated therewith, and the red-sensitive silver halide emulsion layer will have a cyan or cyan-forming dye-releaser associated therewith. The dye-releaser associated with each silver halide emulsion layer may be contained either in the silver halide emulsion layer itself or in a layer contiguous to the silver halide emulsion layer.

The concentration of dye-releasing compounds that can be employed in the present invention may be varied over a wide range, depending upon the particular compound employed and the results which are desired. For example, dye-releasers may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the dye-releasing compound a variety of silver halide developing agents can be employed. In certain embodiments of the invention, any silver halide developing agent can be employed as long as it crossoxidizes with the dye-releasers described herein. The developer may be employed in the photosensitive element to be activated by the alkaline processing composition. Specific examples of developers which can be employed in this invention include:

N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine,
etc.

The non-chromogenic developers in this list are preferred, however, since they avoid any propensity of staining the dye image-receiving layer.

In one of the preferred embodiments of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferrable in alkaline processing composition either by virtue of its self-diffusivity or by having attached to it one or more solubilizing groups, for example, a carboxy, sulpho, sulphonamido, hydroxy or morpholino group.

In using dye-releasing compounds which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material can be employed as the image-receiving layer in this invention as long as the desired function of mordanting or otherwise fixing the dye images will be obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization," and pages 108 and 109, paragraph XV, "Spectral sensitization," of the above article; they can be protected against the production of fog and can be stabilized against loss of sensitivity during keeping by employing the materials described on page 107, paragraph V, "Antifoggants and stabilizers," of the above article; they can contain development modifiers, hardeners, and coating aids as described on pages 107 and 108, paragraph IV, "Development modifiers"; paragraph VII, "Hardeners"; and paragraph XII, "Coating aids," of the above article; they and other layers in the photographic elements used in this invention can contain plasticizers, vehicles and filter dyes described on page 108, paragraph XI, "Plasticizers and lubricants," and paragraph VIII, "Vehicles," and page 109, paragraph XVI, "Absorbing and filter dyes," of the above article; they and other layers in the photographic elements used in this invention may contain addenda which are incorporated by using the procedures described on page 109, paragraph XVII, "Methods of addition," of the above article; and they can be coated by using the various techniques described on page 109, paragraph XVIII, "Coating procedures," of the above article, the disclosures of which are hereby incorporated by reference.

The term "nondiffusing" used herein has the meaning commonly applied to the term in photography and denotes materials that for all practical purposes do not migrate nor wander through organic colloid layers such as gelatin in an alkaline medium, in the photographic elements of the invention and preferably when processed in a medium having a pH of 11 or greater. The same meaning is to be attached to the term "immobile." The term "diffusible" as applied to the materials of this invention has the converse meaning and denotes materials having the property of diffusing effectively through the colloid layers of the photographic elements in an alkaline medium in the presence of "non-diffusing" materials. "Mobile" has the same meaning.

In the preferred embodiment, the film unit is an integral film unit wherein the receiver, dye forming layer and cover sheet are permanently attached to one another before, during and after processing.

The term "associated therewith" means that the chelating dye or dye former is either in the same layer as the silver halide emulsion or in an adjacent layer so long as the oxidation of the dye or dye former is achieved.

The following examples are presented for a further understanding of the invention.

EXAMPLE 1

Poly(acrylamide-co-N-vinylbenzyliminodiacetic acid disodium salt) (80:20)$_w$

A slurry of 10 g of N-vinylbenzylininodiacetic acid in 350 ml of water was adjusted to pH 5.5 by the addition of 50 percent sodium hydroxide solution. To the resultant solution was added 100 ml of ethanol, 40 g of acrylamide, and 250 mg of potassium persulfate. The reaction was then flushed with nitrogen and heated at 60° C. overnight. The viscous polymer solution was diluted with 835 ml of water, and one-third was dialyzed overnight. The dialysate was freeze-dried to yield 16 g of product.

Anal. Found: C, 47.1; H, 6.6; N, 14.8; $[\eta]_{0.1\ N\ NaCl}=1.31$.

To another one-third portion of the above crude polymer solution (13.4 meq chelate sites) was added dropwise 13.4 ml of 1 N nickel(II) chloride which had been diluted to 40 ml with water. A polymeric chelate separated in the form of a dispersion. The particle size of the nickel chelate dispersion was less than 1μ. The dispersion was dialyzed overnight to remove uncomplexed nickel. The purified dispersion was found to contain 6.2 mg of nickel per ml of solution at 6.1 percent solids.

EXAMPLE 2

Poly(sodium 2-sulfoethyl methacrylate-co-N-vinylbenzyliminodiacetic acid nickel(II) chelate) (1:1)$_w$ A slurry of 40 g of N-vinylbenziminodiacetic acid in 720 ml of water was adjusted to pH 5.5 by the addition of 50 percent sodium hydroxide solution. To the resultant solution was added 44.6 g of sodium 2-sulfoethyl methacrylate and 800 mg of potassium persulfate. The reaction vessel was purged with nitrogen and the solution was stirred at 60° C. overnight. The polymer dope was diluted with 1340 ml of water and a solution of 162 ml of 1 N nickel(II) chloride solution that had been diluted to 535 ml with water was added dropwise. A soluble, light-green polymeric chelate was formed. The solution was dialyzed overnight to remove uncomplexed nickel ions and was then concentrated to 7.6 percent solids on the rotary evaporator. It was determined by atomic absorption spectroscopy that the sample contained 7.04 mg of nickel per ml of solution.

EXAMPLE 3

Polymers in a Color Image Transfer Film Unit

A series of six photographic single-color, integral imaging receiver elements were prepared by coating the following layers successively on a polyester film support:

(1) and (2) a receiving layer combination comprised of a mordant layer and a metal-chelating polymer layer as described below;

(3) a reflecting layer comprising titanium dioxide and gelatin;

(4) an opaque layer of carbon dispersed in gelatin;

(5) a layer comprising gelatin and a dispersion of the dye-releasing Compound A*;

(6) a layer of green-sensitive internal image emulsion, as described in Evans, U.S. Pat. No. 3,761,276 (1.35 g/m² Ag, 1.35 g/m² gelatin), with fogging agents of element 49 of Leone et al, U.S. Pat. No. 4,030,925, and 5-octadecylhydroquinone-2-sulfonic acid (16 g/mole Ag);

(7) a layer of didodecylhydroquinone (1.29 g/m²) dispersed in gelatin (1.61 g/m²); and (8) a gelatin overcoat layer.

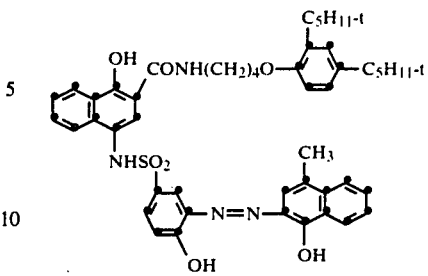

*Compound A

The six receiving layer combinations had varying mordant compositions and varying location of the chelating polymer layer relative to the mordant layer.

The polymeric chelate layers comprise:

Ch-1: Poly(2-sulfoethyl methacrylate, sodium salt-co-N-vinylbenzyliminodiacetic acid) (50/50) (1.40 g/m²) converted to the chelate by the addition of nickel sulfate hexahydrate;

Ch-2: Same as Ch-1, except containing additionally a swellable hydrophilic colloid.

The mordant layers comprise either a cationic mordant (CAT) or poly(4-vinylpyridine) (P4VP).

CAT: A mixture of poly(styrene-co-N-benzyl-N,N-dimethyl-N-vinylbenzylammonium sulfate-co-divinylbenzene) (49/49/2) and gelatin, each at 2.28 g/m².

P4VP: A mixture of poly(4-vinylpyridine) and gelatin, each at 2.15 g/m².

The six receiving layer combinations are described along with data obtained from the processed elements in the following table.

Each of these integral elements was exposed through a graduated density scale, then processed by spreading between it and a processing cover sheet (as described in Hannie and Ducharme, U.S. Pat. No. 4,061,496, issued Dec. 6, 1977) at 22° C. a viscous processing composition (as described in Hannie and Ducharme, U.S. Pat. No. 4,061,496, issued Dec. 6, 1977), by passing the transfer "sandwich" between a pair of juxtaposed rollers so that the liquid layer was about 75 μm.

The light stability was measured by exposing half of a scale-exposed and processed laminate (at least 24 hours after lamination) to a 40-day SANS (simulated average northern skylight) irradiation fading (500 foot-candles) test, the other half being covered. Sensitometric curves are plotted from each half and the green optical density loss, on fading at the place on the curve where the original density is 1.0, was determined. The light stability in all of the experiments containing metal ion is substantially improved over that of the control with no chelating polymer.

TABLE I

| Example | Layer 1 (bottom) | Layer 2 (top) | $D_{max}$ | $D_{min}$ | Light Stability (loss on 40-day SANS) | $\lambda_{max}$ of Dye After 6 min | $\lambda_{max}$ of Dye After 24 hr |
|---|---|---|---|---|---|---|---|
| Control (no metal ion) | CAT | None | 1.55 | 0.21 | −0.56 | 580 | 533 |
| 3A | CAT | Ch-1 | 1.14 | 0.20 | −0.14 | 528 | 537 |
| 3B | CAT | Ch-2 | 1.27 | 0.20 | −0.07 | 538 | 537 |
| 3C | Ch-2 | CAT | 1.64 | 0.21 | −0.06 | 578 | 535 |
| 3D | P4VP | Ch-2 | 1.64 | 0.27 | −0.02 | 535–565 | 535–562 |
| 3E | Ch-2 | P4VP | 2.21 | 0.26 | −0.01 | 565. | 565. |

TABLE I-continued

| Example | Layer 1 (bottom) | Layer 2 (top) | $D_{max}$ | $D_{min}$ | Light Stability (loss on 40-day SANS) | $\lambda_{max}$ of Dye After 6 min | 24 hr |
|---|---|---|---|---|---|---|---|
| | | | | | | 535sh | 535sh |

A separate set of samples of the unexposed coatings (which develop to $D_{max}$ because of the direct-positive process) were processed as above and scanned successively with a spectrophotometer at various time intervals after lamination. The $\lambda_{max}$ values of the spectra in the 6-minute and 24-hour scans are also shown in Table I.

In the Control, the uncomplexed dye after 6 minutes (still high pH) is blue-violet with $\lambda_{max}$ at 580 nm at the pH of the laminate. By 24 hours, the pH has dropped to 4 or 5, and the uncomplexed dye has a $\lambda_{max}$ of about 533 nm.

The low $\lambda_{max}$ at the high pH in Examples 3A and 3B, containing the chelating polymer layers on top, indicate that the dye is complexed by the metal. In Example 3C, the dye on the mordant layer appears initially not to be chelated at the high pH. The "flat-topped" or double-banded spectra, $\lambda_{max}$=535 to 565 nm obtained in Experiments 3D and 3E at both pH conditions, are probably characteristic of a stable nickel chelate of the dye in which the pyridine nitrogen of the mordant acts as a ligand. The polymer thus yields the metal ion to the dye to form the complex of the dye, metal and mordant together.

Coupled with the marked increase in dye stability in those coatings containing metal ion, the spectrophotometric data tend to show that the dye is substantially complexed at the lower pH reached after 24 hours.

The invention has been described in detail with particular reference to preferred embodiments thereof, but it will be understood that variations and modifications can be effected within the spirit and scope of the invention.

What is claimed is:

1. A dye image-receiving element comprising a support having thereon a layer which comprises a polymer having the formula:

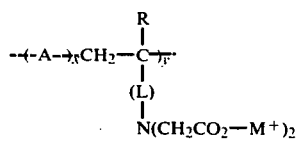

wherein:

(A) is a unit selected from the group consisting of:

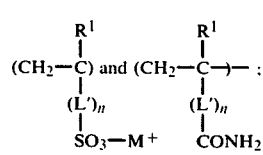

R and $R^1$ are independently H, halogen or alkyl;
L and L' are independent linking groups;
n is 0 or 1;
M is selected from the group consisting of H, an ammonium cation and alkali metal;

x is from 20 to 95 weight percent; and
y is from 80 to 5 weight percent.

2. The dye image-receiving element of claim 1 wherein L and L' are independently selected from the group consisting of arylene, alkylene, carboxyalkylene, carboxyarylene, iminocarboxyalkylene, alkyleneiminocarboxylalkylene, and carbonyl.

3. The dye image-receiving element of claim 1 wherein M is selected from the group consisting of hydrogen, ammonium, tetraethylammonium, potassium, sodium and lithium.

4. The dye image-receiving element of claim 1 wherein said polymer is present in a concentration of from 0.35 to 2.80 g/m².

5. The dye image-receiving element of claim 1 wherein the polymer also comprises $(B)_z$, wherein (B) is a recurring unit capable of mordanting photographic dyes, and z is up to 60 weight percent.

6. A dye image-receiving element comprising a support having thereon a layer which comprises a polymer having the formula:

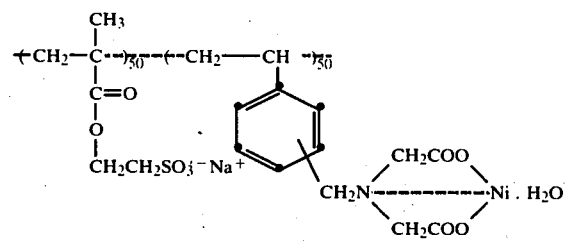

7. A photographic element comprising a support, a dye image-receiving layer and at least one layer containing a chelating acid dye or dye precursor wherein the dye image-receiving layer comprises a polymer having the formula:

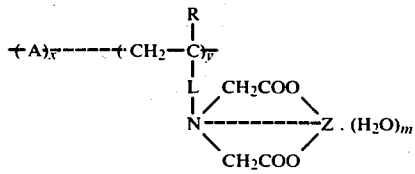

wherein:

(A) is selected from the group consisting of:

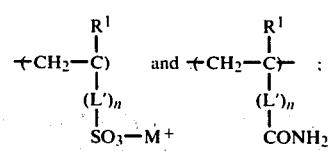

R and $R^1$ are independently H, halogen or alkyl containing from 1 to 6 carbon atoms;
L and L' are independent linking groups;
n is 0 or 1;

M is selected from the group consisting of H, an ammonium cation and alkali metal;
Z is a transition metal;
x is from 20 to 95 weight percent;
y is from 80 to 5 weight percent; and
m is 1, 2 or 3.

8. The photographic element of claim 7 wherein L and L' are selected from the group consisting of alkylene, arylene, carbonyloxyalkylene, carbonyloxyarylene, iminocarbonyloxyalkylene, alkyleneiminocarbonyloxyalkylene and carbonyl.

9. The photographic element of claim 7 wherein M is selected from the group consisting of H, ammonium, tetraethylammonium, potassium, sodium and lithium.

10. The photographic element of claim 7 wherein Z is selected from the group consisting of Cu(II) and Ni(II).

11. The photographic element of claim 7 wherein said polymer is present in a coverage of from 0.35 to 2.80 g/m².

12. A photographic element containing a support, a dye image-receiving layer and at least one layer containing a chelating acid dye or dye former, wherein the dye image-receiving layer comprises a polymer having the formula:

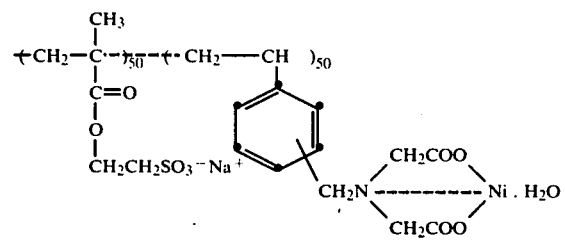

13. A photographic element as in claim 7 wherein the polymer also comprises $+B+_z$, wherein (B) is a recurring unit capable of mordanting photographic dyes, and z is from 0 to 60 weight percent.

14. A dye image-receiving element comprising a support having thereon a layer comprising a polymer having the formula:

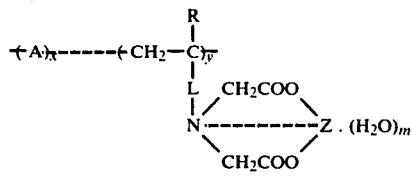

wherein:
(A) is selected from the group consisting of:

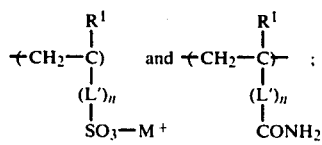

R and R¹ are independently H, halogen or alkyl containing from 1 to 6 carbon atoms;
L and L' are independent linking groups;
n is 0 or 1;
M is selected from the group consisting of H, an ammonium cation and alkali metal;
Z is a transition metal;
x is from 20 to 95 weight percent;
y is from 80 to 5 weight percent; and
m is 1, 2 or 3.

15. The dye image-receiving element of claim 14 wherein L and L' are independently selected from the group consisting of alkylene, arylene, carbonyloxyalkylene, carbonyloxyarylene, iminocarbonyloxyalkylene, alkyleneiminocarbonyloxyalkylene and carbonyl.

16. The dye image-receiving element of claim 14 wherein M is selected from the group consisting of H, ammonium, tetraethylammonium, potassium, sodium and lithium.

17. The dye image-receiving element of claim 14 wherein Z is selected from the group consisting of Cu(II) and Ni(II).

18. The dye image-receiving element of claim 14 wherein said polymer is present in a concentration of from 0.35 g/m² to 2.80 g/m².

19. The dye image-receiving element of claim 14 wherein the polymer also comprises $+B+_z$, wherein (B) is a recurring unit capable of mordanting photographic dyes, and z is from 0 to 60 weight percent.

20. A dye image-receiving element comprising a support having thereon a layer which comprises a polymer having the formula:

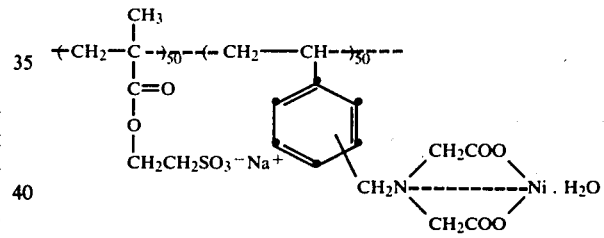

21. In an image transfer film unit comprising:
(1) a support containing thereon at least one layer containing a photosensitive silver halide emulsion having associated therewith a chelating dye or dye precursor;
(2) a dye image-receiving layer; and
(3) an alkaline processing composition and means for discharging same within said film unit in contact with said photosensitive layer;
said film unit containing a silver halide developing agent, the improvement wherein the dye image-receiving layer comprises a polymer having the formula:

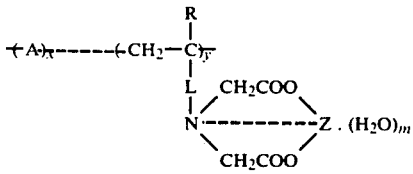

wherein:
(A) is selected from the group consisting of:

$$+CH_2-C) \quad \text{and} \quad +CH_2-C) \quad ;$$
$$\begin{array}{c} R^1 \\ | \\ (L')_n \\ | \\ SO_3{-}M^+ \end{array} \quad \begin{array}{c} R^1 \\ | \\ (L')_n \\ | \\ CONH_2 \end{array}$$

R and $R^1$ are independently H, halogen or alkyl containing from 1 to 6 carbon atoms;
L and L' are independent linking groups;
n is 0 or 1;
M is selected from the group consisting of H, an ammonium cation and alkali metal;
Z is a transition metal;
x is from 20 to 95 weight percent;
y is from 80 to 5 weight percent;
m is 1, 2 or 3.

22. The image transfer film unit of claim 21 wherein L and L' are independently selected from the group consisting of alkylene, arylene, carbonyloxyalkylene, carbonyloxyarylene, iminocarbonyloxyalkylene, alkyleneiminocarbonyloxyalkylene and carbonyl.

23. The image transfer film unit of claim 21 wherein M is selected from the group consisting of H, ammonium, tetraethylammonium, potassium, sodium and lithium.

24. The image transfer film unit of claim 21 wherein Z is selected from the group consisting of Cu(II) and Ni(II).

25. The image transfer film unit of claim 21 wherein said polymer is present in a concentration of from 0.35 g/m$^2$ to 2.80 g/m$^2$.

26. The image transfer film unit of claim 21 wherein the polymer also comprises $-(B)_z$, wherein (B) is a recurring unit capable of mordanting photographic dyes, and z is up to 60 weight percent.

27. In an image transfer film unit comprising:
(1) a support containing thereon at least one layer containing a photosensitive silver halide emulsion having associated therewith a chelating dye or dye precursor;
(2) a dye image-receiving layer;
(3) an alkaline processing composition and means for discharging same within said film unit in contact with said photosensitive silver halide emulsion;
(4) a neutralizing layer for neutralizing said alkaline processing composition; and
(5) a barrier which is permeable by said alkaline processing composition after a predetermined time located between said neutralizing layer and all of said photosensitive silver halide emulsions;

said film unit containing a silver halide developing agent, the improvement wherein the dye image-receiving layer comprises a polymer having the formula:

$$+A)_x\text{-----}(CH_2-C)_y\text{-}$$
$$\begin{array}{c} R \\ | \\ L \\ | \\ N\text{---------}Z \cdot (H_2O)_m \\ / \quad \backslash \\ CH_2COO \quad CH_2COO \end{array}$$

wherein:
(A) is selected from the group consisting of:

$$+CH_2-C) \quad \text{and} \quad +CH_2-C) \quad ;$$
$$\begin{array}{c} R^1 \\ | \\ (L')_n \\ | \\ SO_3{-}M^+ \end{array} \quad \begin{array}{c} R^1 \\ | \\ (L')_n \\ | \\ CONH_2 \end{array}$$

R and $R^1$ are independently H, halogen or alkyl containing from 1 to 6 carbon atoms;
L and L' are independent linking groups;
n is 0 or 1;
M is selected from the group consisting of H, an ammonium cation and alkali metal;
Z is a transition metal;
x is from 20 to 95 weight percent;
y is from 80 to 5 weight percent; and
m is 1, 2 or 3.

28. In an image transfer film unit comprising:
(1) a support containing thereon at least one layer containing a photosensitive silver halide emulsion having associated therewith a chelating dye or dye precursor;
(2) a dye image-receiving layer; and
(3) an alkaline processing composition and means for discharging same within said film unit in contact with said photosensitive layer;

said film unit containing a silver halide developing agent, the improvement wherein the dye image-receiving layer comprises a polymer having the formula:

$$+CH_2-C)_{50}\text{-}(CH_2-CH)_{50}$$
$$\begin{array}{c} CH_3 \\ | \\ C=O \\ | \\ O \\ | \\ CH_2CH_2SO_3{-}Na^+ \end{array} \quad \begin{array}{c} \\ \\ \\ \\ CH_2N\text{---------}Ni \cdot (H_2O)_m \\ / \quad \backslash \\ CH_2COO \quad CH_2COO \end{array}$$

29. In an integral photographic assemblage comprising:
(a) a photosensitive element comprising a transparent support having thereon the following layers in sequence a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;
(b) a transparent sheet superposed over said blue-sensitive silver halide emulsion layer and comprising a transparent support having thereon, in sequence, a neutralizing layer and a timing layer; and
(c) a rupturable container containing an alkaline processing composition and an opacifying agent which is so positioned during processing of said assemblage that a compressive force applied to said container will effect a discharge of the container's contents between said transparent sheet and said blue-sensitive silver halide emulsion layer; said assemblage containing a silver halide developing agent; the improvement wherein said dye image-receiving layer comprises a polymer having the formula:

$$+A)_x----(CH_2-C)_y$$
$$\quad\quad\quad\quad\quad\quad |\ R$$
$$\quad\quad\quad\quad\quad L\ \ CH_2COO$$
$$\quad\quad\quad\quad\quad | \diagup$$
$$\quad\quad\quad\quad\quad N---------Z\ .\ (H_2O)_m$$
$$\quad\quad\quad\quad\quad\quad \diagdown$$
$$\quad\quad\quad\quad\quad\quad CH_2COO$$

wherein:

(A) is selected from the group consisting of:

$$+CH_2-C) \quad \text{and} \quad +CH_2-C)-$$
$$\quad |\ R^1 \quad\quad\quad\quad\quad |\ R^1$$
$$\quad (L')_n \quad\quad\quad\quad\quad (L')_n$$
$$\quad |\quad\quad\quad\quad\quad\quad |$$
$$\quad SO_3-M^+ \quad\quad\quad\quad CONH_2$$

R and $R^1$ are independently H, halogen or alkyl containing from 1 to 6 carbon atoms;
L and L' are independent linking groups;
n is 0 or 1;
M is selected from the group consisting of H, an ammonium cation and alkali metal;
Z is a metal;
x is from 20 to 95 weight percent;
y is from 80 to 5 weight percent; and
m is 1, 2 or 3.

30. The assemblage of claim 29 wherein the polymer has the formula:

$$+CH_2-C-)_{50}-(-CH_2-CH-)_{50}$$
$$\quad\quad |\ CH_3$$
$$\quad\quad C=O$$
$$\quad\quad |$$
$$\quad\quad O$$
$$\quad\quad |$$
$$\quad\quad CH_2CH_2SO_3^-Na^+$$

with pendant:

$$CH_2N\begin{array}{c}CH_2COO\\ \diagdown\\ ---------Ni\ .\ H_2O\\ \diagup\\ CH_2COO\end{array}$$

31. In a process of producing a photographic transfer image in a photographic element comprising a support having thereon at least one photosensitive silver halide emulsion layer having associated therewith a chelating dye or dye precursor and an image-receiving layer comprising:
(a) exposing and treating said element with an alkaline processing composition in the presence of a silver halide developing agent to effect development of each of said exposed silver halide emulsion layers;
(1) an imagewise distribution of dye or dye precursors being formed as a function of development; and
(2) at least a portion of said imagewise distribution of dye or dye precursor diffusing to said dye image-receiving layer;
the improvement wherein said dye image-receiving layer comprises a polymer having the formula:

$$+A)_x----(CH_2-C)_y$$
$$\quad\quad\quad\quad\quad\quad |\ R$$
$$\quad\quad\quad\quad\quad L\ \ CH_2COO$$
$$\quad\quad\quad\quad\quad | \diagup$$
$$\quad\quad\quad\quad\quad N---------Z\ .\ (H_2O)_m$$
$$\quad\quad\quad\quad\quad\quad \diagdown$$
$$\quad\quad\quad\quad\quad\quad CH_2COO$$

wherein:

(A) is selected from the group consisting of:

$$+CH_2-C) \quad \text{and} \quad +CH_2-C)-$$
$$\quad |\ R^1 \quad\quad\quad\quad\quad |\ R^1$$
$$\quad (L')_n \quad\quad\quad\quad\quad (L')_n$$
$$\quad |\quad\quad\quad\quad\quad\quad |$$
$$\quad SO_3-M^+ \quad\quad\quad\quad CONH_2$$

R and $R^1$ are independently H, halogen or alkyl containing from 1 to 6 carbon atoms;
L and L' are independent linking groups;
n is 0 or 1;
M is selected from the group consisting of H, an ammonium cation and alkali metal;
Z is a transition metal;
x is from 20 to 95 weight percent;
y is from 80 to 5 weight percent; and
m is 1, 2 or 3.

32. The process of claim 31 wherein L and L' are independently selected from the group consisting of alkylene, arylene, carbonyloxyalkylene, carbonyloxyarylene, iminocarbonyloxyalkylene, alkyleneiminocarbonyloxyalkylene and carbonyl.

33. The process of claim 31 wherein M is selected from the group consisting of H, ammonium, tetraethylammonium, potassium, sodium and lithium.

34. The process of claim 31 wherein Z is selected from the group consisting of Cu(II) and Ni(II).

35. The process of claim 31 wherein said polymer is present in a concentration of from 35 g/m² to 280 g/m².

36. The process of claim 31 wherein the polymer also comprises $-(B)_z$, wherein (B) is a recurring unit capable of mordanting photographic dyes, and z is up to 60 weight percent.

37. In a process of producing a photographic transfer image in a photographic element comprising a support having thereon at least one exposed photosensitive silver halide emulsion layer having associated therewith a chelating dye or dye precursor and an image-receiving layer comprising:
treating said element with an alkaline processing composition in the presence of a silver halide developing agent to effect development of each of said exposed silver halide emulsion layers;
(1) an imagewise distribution of dye or dye precursors being formed as a function of development; and
(2) at least a portion of said imagewise distribution of dye or dye precursor diffusing to said dye image-receiving layer;
the improvement wherein said dye image-receiving layer comprises a polymer having the formula:

38. A dye image receiving element containing a support having thereon at least one layer containing a mordant and a metallized dye, said element containing a polymer having the formula:

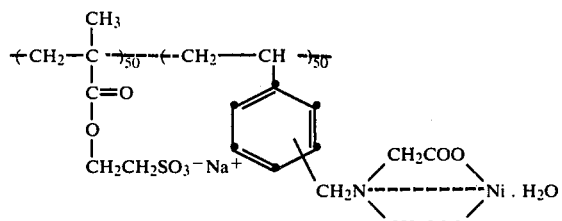

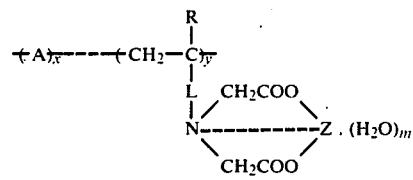

wherein:

(A) is selected from the group consisting of:

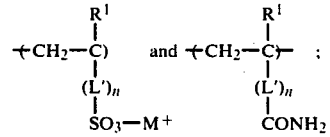

R and $R^1$ are independently H, halogen or alkyl containing from 1 to 6 carbon atoms;
L and $L'$ are independent linking groups;
n is 0 or 1;
M is selected from the group consisting of H, an ammonium cation and alkali metal;
Z is a transition metal;
x is from 20 to 95 weight percent;
y is from 80 to 5 weight percent; and
m is 1, 2 or 3.

* * * * *